(No Model.)
J. B. BUTTS.
CAR COUPLING.
No. 356,569. Patented Jan. 25, 1887.
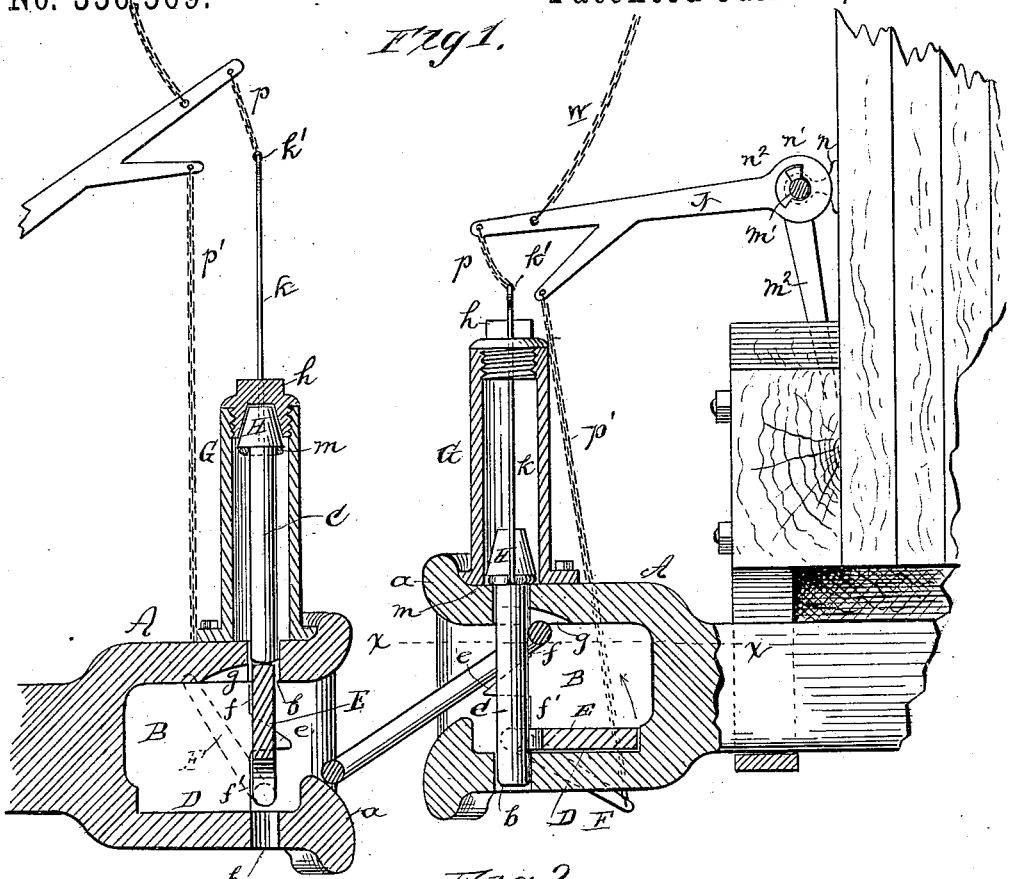
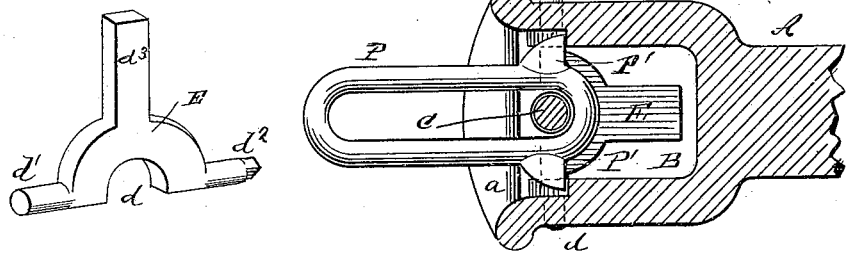
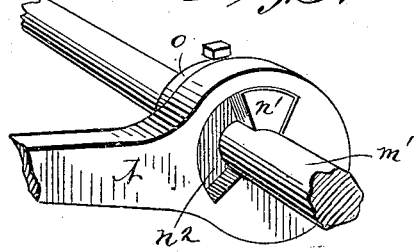
WITNESSES:
J. D. Tanfield
C. Sedgwick
INVENTOR:
J. B. Butts
BY Munn & Co
ATTORNEYS.

# UNITED STATES PATENT OFFICE.

J. BAPTIST BUTTS, OF PHILADELPHIA, PENNSYLVANIA.

CAR-COUPLING.

SPECIFICATION forming part of Letters Patent No. 356,589, dated January 25, 1887.

Application filed August 17, 1886. Serial No. 211,148. (No model.)

*To all whom it may concern:*

Be it known that I, J. BAPTIST BUTTS, of the city of Philadelphia, in the county of Philadelphia and State of Pennsylvania, have invented a new and Improved Car-Coupling, of which the following is a full, clear, and exact description.

My invention relates to certain new and useful improvements in car-couplers, and has for its object to produce a coupling device whereby the cars couple themselves automatically, and may be uncoupled or set to couple from either end or the top of the car without the necessity of going between the cars; also, to produce a coupling that will unite with any form of link-coupler, and in which it is possible to readily couple with an opposing coupler of greater or less height.

It consists in the construction and combination of the parts, as will be hereinafter fully set forth, and pointed out in the claims.

Reference is to be had to the accompanying drawings, forming a part of this specification, in which similar letters of reference indicate corresponding parts in all the figures.

Figure 1 is a central vertical section through opposing couplers in process of coupling. Fig. 2 is a horizontal section through line $x\ x$ of one of the couplers shown in Fig. 1. Fig. 3 is a detail view showing the connection between the trip-lever and operating-rod; and Fig. 4 is a detail view of the dog used to support the link when uncoupled.

A is a draw-head, more or less oval in form, and preferably made of a single casting, provided with a full bell-shaped mouth, $a$, link-opening B, and a central aperture, $b$, extending through said draw-head near the bell-shaped mouth thereof, the said aperture adapted to receive a coupling-pin, C, operated in a manner hereinafter described.

In the bottom of the link-opening B of the draw-head a recess, D, is formed, corresponding in contour with the pivotal dog E, which it is adapted to receive. The said dog E is constructed with a semicircular recessed body, $d$, provided with pivot-pins $d'\ d^2$, attached to the side extremities of the said body $d$, and an integral central projection, $d^3$, as illustrated in Fig. 4. The aforesaid dog E is pivoted transversely by means of the pins $d'\ d^2$ in the side walls of the draw-head A, to rest within the recess D flush with the bottom wall of the link-opening B, as shown in Fig. 2. The one pivot-pin $d^2$ of the dog E is extended outside the draw-head A to receive a short lever, F, by which the said dog E is operated.

The side walls of the link-opening B are so recessed as to have formed thereon a central outward projection, $e$, having an inclined upper and a straight under face, together with vertical shoulders $f\ f'$, the one above the other below the said central projection, $e$, in line with the inner side of the pin-aperture $b$. The upper wall of the link-opening B is also provided with a recess, $g$, which, commencing from a point to the rear, is curved upward to terminate at its intersection with the aperture $b$ of the coupling-pin. The purpose of the various recesses described and the central projection contained within the link-opening B will be hereinafter fully set forth.

The perforation $b$, adapted to receive the coupling-pin C, is encircled by a tubular casing, G, attached to the upper outer face of the draw-head A, to extend vertically upward therefrom, inclosed at the top by means of a hollow nut, $h$, screwed therein. The inner under sides of the said nut $h$ are made tapering toward the center, and two holes, one upon each side, are provided therein for the passage of rods $k$ through the nut. The said rods $k$ are united at the top over the hollow nut $h$, and provided at this point with a central loop, $k'$. The ends of the rods $k$, extended down within the tubular casing G, are secured one upon each side to a ring, $m$, which, loosely encircling the coupling-pin C, is held by said attached rods $k$ to a bearing against the tapering projecting head H of said coupling-pin C. The tapering contour of the head H corresponds to the taper of the nut $h$, as when the pin, through the rods $k$, is elevated, by means hereinafter described, the tapered head thereof is adapted to enter and bear against the under face of the said nut.

I support in suitable brackets, $n$, transversely the end of the car, above the sill thereof, a rod, $m'$, provided with a crank-arm, $m^2$, at each end to operate the coupling-pin C from the sides of the car. This is effected by attaching to the transverse rod $m$ a lug or pin, $n'$, having a semicircular top in line with the tubular casing G, upon the draw-head A.

A forked lever, N, provided with a segmental recess, $n^2$, cut partially through one end thereof, is entered upon the rod $m'$, so that the lug $n'$ will enter the said segmental recess $n^2$, and the lever is held in this position upon the rod by means of a collar, $o$, bearing against its smooth side, keyed to said rod or held thereon by a set-screw, as shown in Fig. 3.

The horizontal or straight arm of the lever N is attached to the eye $k'$ of the pin-rods $k$ by means of a chain, $p$, while the forked arm of said lever is likewise attached by a chain, $p'$, to the lever F, operating the dog E.

The link P, used in connection with my coupling, is the standard form of link, provided at one end, near the curve thereof, with side lugs, P', formed with a curved outer surface and a straight inner or bearing surface, as shown in Fig. 2.

My coupling thus provided with the side shoulders, $f f'$, and central side projections, $e$, within the link-opening B, presents two independent bearings for the link. When the link is placed above the central side projections, $e$, the lugs P' of the link bear against the side shoulders, $f$, which prevent the link from running back in the coupler, and the inclined faces of the central side projections, $e$, permit the link to couple with a lower opposite coupler equally as well as with one of equal height. When it is necessary to couple with an opposing coupler of less height, the link is placed above the central side projections, $e$, the lugs thereon bearing against the side shoulders, $f$. The link will then have a downward inclination capable of engaging an opposing coupler of much less height. Should the link merely strike the curve of the bell in either case, it will readily enter and couple, as sufficient play is allowed therefor in both the upper and lower bearings. Ordinarily the link is carried above the central side projections, $e$, as shown in the drawings.

When it is desired to uncouple, one of the levers, $m^2$, at the side of the cars, is turned, or the lever N can be raised directly by means of a chain, $w$, running to the top of the car, one end of which chain is attached to the lever N. When the lever ascends, the long arm thereof, with its connecting-chain, will raise the rods $k$, and thereby withdraw the coupling-pin C from engagement with the link P, up within the tubular casing G, the head H of the pin entering the hollow nut $h$ simultaneously with the said withdrawal of the pin. By means of the connection of the forked arm of the lever N with the lever F of the dog E the said dog is elevated, following immediately after the pin, so that as the pin is covered in the tubular casing G the dog E will have assumed a vertical position within the link-opening B, directly under the pin, to form a support therefor. The lever N at this point drops, the chains slacken, and the rods $k$ and attached ring $m$ drop down within the tubular casing G. When it is desired to couple again, the coupler, with the link and pin in position, as shown to the right in Fig. 1 and in Fig. 2, is carried toward its opposing coupler in position, as above described and shown, to the left of Fig. 1. As soon as the link enters the coupling and strikes the dog E, it falls in its recess out of the way, and the pin supported thereby drops through the link.

As it will be seen from the above description, my coupling is simple, sure, and durable, and in addition will readily couple with any opposing coupler, whether higher or lower than itself. It can also be operated as readily from the top of the car as from the sides thereof.

By means of the segmental recess $n^2$ of the forked lever N and the lug $n'$ of the rod $m'$ the said lever can be operated from above without moving the said rod $m'$ or its crank-arms $m^2$, and vice versa.

Should the pin become broken within the tubular casing G the link may be employed to turn the nut $h$ thereon. Upon removing the nut $h$ the old pin is readily removed and a new one quickly inserted.

Should there be a link in the coupler which it is desired to set to couple with an opposite coupler, as the pin C and the dog E are raised the dog E acts as a lever on the link and throws the same out of the draw-head.

Having thus described my invention, what I claim as new, and desire to secure by Letters Patent, is—

1. The combination, with a draw-head provided with a pin-opening, $b$, and upper tubular casing, G, of a coupling-pin, C, having attached thereto rods $k$ and ring $m$, together with means for operating said rods and pin, substantially as shown and described, and for the purpose herein set forth.

2. The combination, with a draw-head provided with a pin-opening, $b$, pivoted dog E, upper tubular casing, G, and hollow nut $h$, having inner tapering sides, of the coupling-pin C, provided with an extended tapering head, H, and rods $k$, attached thereto by ring $m$, together with means for simultaneously operating said dog E and pin C, substantially as shown and described, and for the purpose herein set forth.

3. A draw-head constructed with a pin-opening, $b$, and link-opening B, the said link-opening provided with a lower recess, D, upper and lower side shoulders, $f f'$, and central angular side projections, $e$, substantially as shown and described, and for the purpose herein set forth.

4. The combination, with a draw-head having a pin-opening, $b$, and a link-opening, B, provided with upper and lower side shoulders, $f f'$, and central angular side projections, $e$, of a link, P, provided with lugs P' at each side, near one end thereof, said lugs adapted to engage said shoulders, substantially as shown and described, and for the purpose herein set forth.

5. In an operating device for car-couplers, the combination, with the transverse rod $m'$, having crank-arms $m^2$ and provided with a circular faced lug, $n'$, attached thereto, of the forked lever N, having a segmental recess, $n^2$, cut partially therein at one end, together with a collar, $o$, rigidly attached to said rod $m'$, substantially as shown and described, and for the purpose herein set forth.

6. The combination, with a draw-head having a pin-opening, B, provided with upper and lower side shoulders, $ff'$, and central angular side projections, $e$, together with a dog, E, pivoted therein, and attached lever F, of a link, P, provided with lugs P' at each side, near one end thereof, substantially as shown and described, and for the purpose herein set forth.

7. The combination, with a draw-head having an opening, $b$, a link-opening, B, provided with a dog, E, pivoted therein, lower recess, D, upper and lower side shoulders, $ff'$, central side projections, $e$, and a lever, F, attached to said dog E, together with an upper tubular casing, G, provided with a perforated hollow nut, $h$, of a coupling-pin, C, having a tapered head, H, and rods $k$, attached thereto by a ring, $m$, together with a forked lever, N, having segmental recess $n^2$, and the transverse rod $m'$, provided with a lug, $n'$, and crank-arm $m^2$, whereby the said pin and dog are simultaneously operated through the chain-connections $pp'$, substantially as shown and described, and for the purpose herein set forth.

J. BAPTIST BUTTS.

Witnesses:
WALTER H. BACON,
JAMES J. REEVES.